(12) United States Patent
Smith

(10) Patent No.: US 10,469,464 B2
(45) Date of Patent: Nov. 5, 2019

(54) SELF-CONFIGURING KEY MANAGEMENT SYSTEM FOR AN INTERNET OF THINGS NETWORK

(71) Applicant: Intel Corporation, Santa Clara, CA (US)

(72) Inventor: Ned M. Smith, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 715 days.

(21) Appl. No.: 14/968,125

(22) Filed: Dec. 14, 2015

(65) Prior Publication Data

US 2016/0366102 A1    Dec. 15, 2016

Related U.S. Application Data

(60) Provisional application No. 62/195,409, filed on Jul. 22, 2015, provisional application No. 62/172,893, filed on Jun. 9, 2015.

(51) Int. Cl.
*H04L 29/06* (2006.01)
*H04L 29/08* (2006.01)
(Continued)

(52) U.S. Cl.
CPC .......... *H04L 63/045* (2013.01); *H04L 9/088* (2013.01); *H04L 9/0822* (2013.01);
(Continued)

(58) Field of Classification Search
CPC ....... H04L 63/045; H04L 9/08; H04L 63/062; H04L 67/12; H04L 63/20
See application file for complete search history.

(56) References Cited

U.S. PATENT DOCUMENTS 8,266,433 B1    9/2012    Przykucki et al.
9,780,954 B2 *  10/2017   Bhattacharya .......... H04L 67/12
(Continued)

FOREIGN PATENT DOCUMENTS

WO    2014017959    1/2014

OTHER PUBLICATIONS

Wang et al., Performance Evaluation of Attribute-Based Encryption: Toward Data Privacy in the IoT, Aug. 2014, IEEE International Conference on Communications, pp. 725-730 (Year: 2014).*
(Continued)

*Primary Examiner* — Kenneth W Chang
(74) *Attorney, Agent, or Firm* — Trop, Pruner & Hu, P.C.

(57) ABSTRACT

In one embodiment, a method includes receiving, in a first device, at least one of a first symmetric key and a first asymmetric key in a common key management structure, the common key management structure to accommodate asymmetric keys and symmetric keys, and further including security policy information to enable communication between the first device of a first domain of an Internet of Things (IoT) network and a second device of a second domain of the IoT network according to an inter-domain security policy; and sending a first message directly from the first device to the second device according to the security policy information of the common key management structure. Other embodiments are described and claimed.

24 Claims, 7 Drawing Sheets

(51) Int. Cl.
  H04L 9/08    (2006.01)
  H04L 9/14    (2006.01)
  H04L 9/32    (2006.01)
  H04W 12/04   (2009.01)
  H04W 84/18   (2009.01)

(52) U.S. Cl.
  CPC .......... H04L 9/0825 (2013.01); H04L 9/0841 (2013.01); H04L 9/14 (2013.01); H04L 9/3213 (2013.01); H04L 63/062 (2013.01); H04L 67/12 (2013.01); H04W 12/04 (2013.01); H04L 63/20 (2013.01); H04W 84/18 (2013.01)

(56) References Cited

U.S. PATENT DOCUMENTS

| | | | | |
|---|---|---|---|---|
| 2007/0192325 | A1* | 8/2007 | Morris | H04L 67/24 |
| 2007/0253376 | A1 | 11/2007 | Bonta et al. | |
| 2008/0126794 | A1* | 5/2008 | Wang | H04L 63/0464 |
| | | | | 713/151 |
| 2008/0304669 | A1* | 12/2008 | Bugbee | H04L 9/0894 |
| | | | | 380/278 |
| 2012/0011360 | A1* | 1/2012 | Engels | H04L 9/006 |
| | | | | 713/166 |
| 2012/0291089 | A1* | 11/2012 | Bomgardner | G06F 21/60 |
| | | | | 726/1 |
| 2013/0170499 | A1 | 7/2013 | Ramanujan et al. | |
| 2014/0241354 | A1* | 8/2014 | Shuman | H04L 67/16 |
| | | | | 370/390 |
| 2015/0121066 | A1* | 4/2015 | Nix | H04W 4/70 |
| | | | | 713/155 |
| 2015/0121470 | A1* | 4/2015 | Rongo | H04W 4/70 |
| | | | | 726/4 |
| 2015/0130957 | A1* | 5/2015 | Berelejis | H04L 67/12 |
| | | | | 348/211.1 |
| 2016/0182459 | A1* | 6/2016 | Britt | H04L 67/12 |
| | | | | 713/171 |
| 2016/0205097 | A1* | 7/2016 | Yacoub | H04L 63/0876 |
| | | | | 726/6 |
| 2016/0353305 | A1* | 12/2016 | Zakaria | H04M 1/72519 |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish-Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+the+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
Openinterconnect.org, "Open Interconnect Consortium: An Overview to Connect Devices Everywhere", http://openinterconnect.org/wp-content/uploads/2015/07/Open-Interconnect-ConsortiumOverview_Final.pdf, Jul. 2015, 7 pages.
Openinterconnect.org, "The Open Interconnect Consortium and IoTivity", http://openinterconnect.org/wp-content/uploads/2015/07/OIC-IoTivity_White-Paper Final11.pdf, Jul. 2015, 5 pages.
Openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
Openinterconnect.org, " Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.
Hardjono, T, et al., "Fluffy: Simplified Key Exchange for Constrained Environments," Network Working Group, MIT/Intel Corp., Mar. 23, 2015, 24 pages.
Hardjono, T, et al., "Fluffy: Simplified Key Exchange for Constrained Environments," Network Working Group, MIT/Intel Corp., Jul. 3, 2015, 46 Pages.

(56) References Cited

OTHER PUBLICATIONS

International Searching Authority, "Notification of Transmittal of the International Search Report and the Written Opinion of the International Searching Authority," dated Aug. 24, 2016, in International application No. PCT/US2016/03582.

European Patent Office, Extended European Search Report dated Nov. 27, 2018 in European patent application No. 16808051.3, 10 pages.

* cited by examiner

SELF-CONFIGURING KEY MANAGEMENT SYSTEM FOR AN INTERNET OF THINGS NETWORK

This application claims priority to U.S. Provisional Patent Application No. 62/195,409 filed on Jul. 22, 2015 and entitled "A SELF-CONFIGURING KEY MANAGEMENT SYSTEM FOR AN INTERNET OF THINGS NETWORK", the content of which is hereby incorporated by reference. Furthermore, this application claims priority to U.S. Provisional Patent Application No. 62/172,893 filed on Jun. 9, 2015 and entitled "SYSTEM, APPARATUS AND METHOD FOR MANAGING LIFECYCLE OF SECURE PUBLISH-SUBSCRIBE SYSTEM", the content of which is hereby incorporated by reference.

BACKGROUND

Internet of Things (IoT) networks may range dramatically in size and complexity from a single sensor connected to a smart device to smart city networks having hundreds of thousands of interconnected nodes. Interoperability between these IoT networks is an issue. For example, different IoT frameworks may incorporate differing device management schemes. Those schemes may include extreme variances in approaches to network and device security. Those schemes may also use different mechanisms for scaling up or down (i.e., adding or subtracting nodes from the IoT networks) according to site specific deployment expectations.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1:
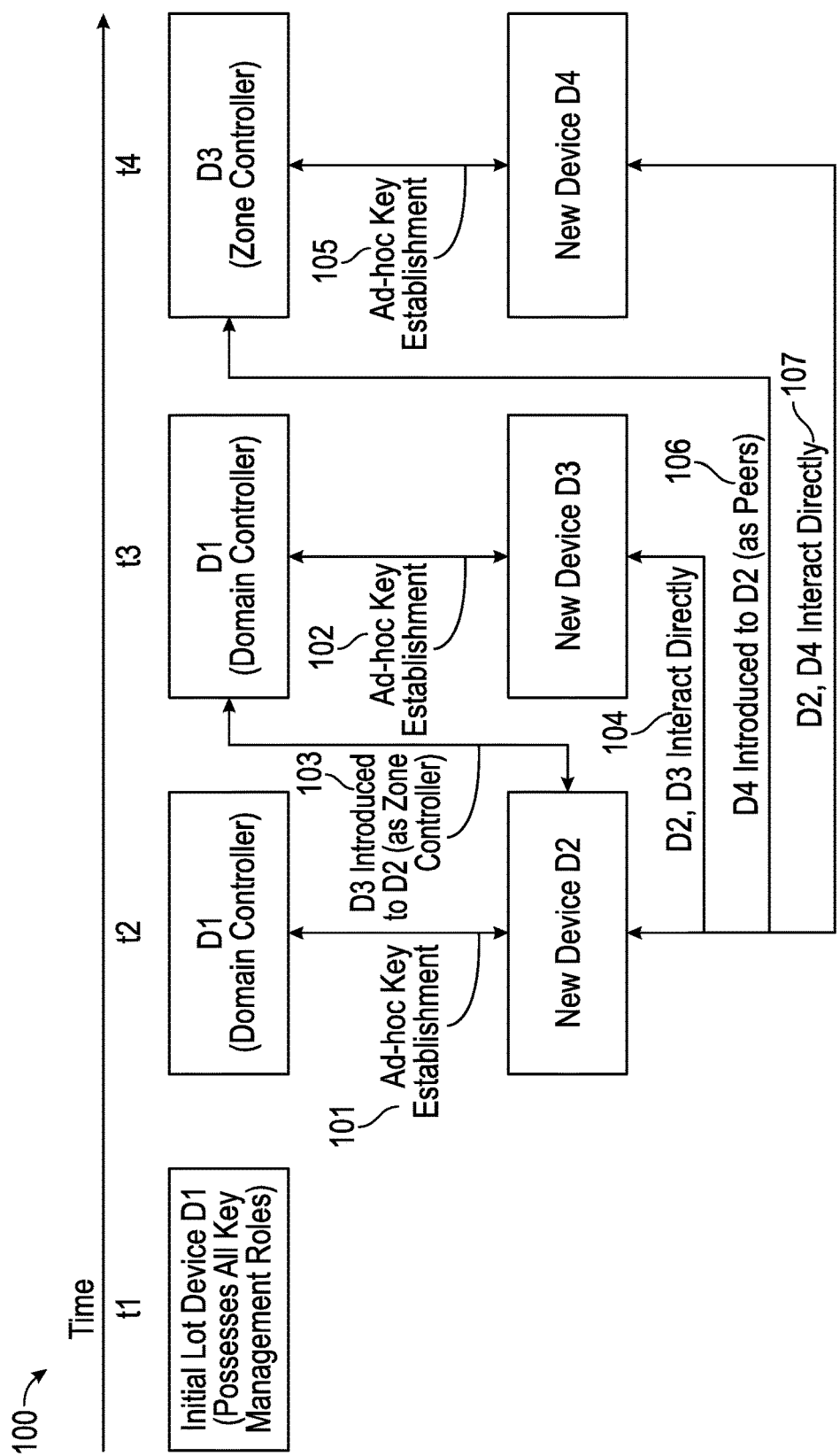
FIG. 1 is a timing diagram illustrating a key management system in accordance with an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments.

"First", "second", "third" and the like describe a common object and indicate different instances of like objects are being referred to. Such adjectives do not imply objects so described must be in a given sequence, either temporally, spatially, in ranking, or in any other manner.

In various embodiments, techniques are provided to enable scalable key management in an IoT network. This allows for secure IoT networks even as those networks grow in size (e.g., number of nodes), complexity (e.g., hierarchies of command among the nodes), and diversity (e.g., IoT network having different nodes from different vendors). More specifically, embodiments provide a key management system that is integrated with the dynamics of IoT network evolution. Given that IoT devices can have widely disparate compute and other capabilities (e.g., processing power and/or storage capacity), and may further have multiple dissimilar transport and network technologies, embodiments provide a common key management system that can implement symmetric cryptography, asymmetric cryptography, or both. To this end, a key management system as described herein can issue both symmetric and asymmetric keys under a common convention for organizing IoT devices and for evolving the IoT network.

In an embodiment IoT devices perform key management functions in proportion to the complexity of the network. As network complexity increases, key management duties expand to accommodate need. Key management duties can be assignable by role privileges that may be assigned as part of on-boarding a device into the network. This key management model allows both ad-hoc and introducer models for extending a network. Nevertheless, both models share the same mechanisms for assigning context (e.g., administrative realm, publish-subscribe topic) to keys. This allows a credential that originated using an ad-hoc key agreement protocol (e.g. Diffie-Hellman or PAKE) to be used with a device that understands introducer methods (e.g. PKI, Kerberos) and vice versa.

In some embodiments, both symmetric and asymmetric keys may be included in a credential so that the constraints of the underlying transport and network layers may be accommodated if security is applied at lower layers. If security is applied at the application layer, the same credentials may be used having consistent security, scope and use semantics.

For example, IoT frameworks such as the Open Interconnect Consortium (OIC) and PC networking framework WinSOCK define a multi-protocol transport or session layering scheme where one type of security is assumed by a first transport and a second type of security is assumed by a second transport. In a scenario where a first IoT device using a first transport connects to a second IoT device supporting both a first and a second transport, the second IoT device will select the credential (symmetric) that enables secure communication with the first device. Whereas, a third IoT device using a second transport will require the 2nd IoT device to select the credential (certificate) suited for the second transport. If a system of devices supporting multiple transports have occasion to connect where there are multiple transports in common, a selection or negotiation of which transport and which credential to use is made. This leads to the case where devices will have multiple credentials that enable secure communication to the same peer device which may lead to a negotiation over which credential type shall be used for a given connection. In such an environment, consistency of security context across differing credential types is necessary to ensure security policies are uniformly applied.

Note that an embodiment of a key management system can be instantiated on a single network node and expand to be shared across multiple nodes as new nodes are added to a network. The key management system (or a given one of multiple instantiated key management devices of the system) can issue credentials that may be used to authenticate and protect devices, data, network services, network zones and various grouping constructs.

Embodiments may integrate multiple approaches under a common infrastructure and provide a mechanism for delegating various IoT behaviors including publish-subscribe, peer-peer, network management and key management function to its members. As such, embodiments can enable use of asymmetric keys (such as typically managed using Public Key Infrastructure (PKI)), symmetric keys (such as typically managed using Kerberos), and further enable ad hoc approaches to key management such as using Diffie-Hellman key agreement to produce symmetric keys between network peers. Thus, embodiments provide a common framework for interoperability and migration between these different approaches to key management.

Referring now to FIG. 1, shown is a process 100 illustrating a key management system in accordance with an embodiment. As seen in FIG. 1, a key management system D1, which may be a server computer or any other type of computing device, bootstraps an IoT network using both ad hoc and third party introduction techniques. More specifically, FIG. 1 shows a timing illustration of key management operations for a plurality of devices in an IoT network in accordance with an embodiment.

In the particular implementation shown, assume an initial key management system D1 (e.g., Smartphone) possesses all key management roles at time t1. Thereafter, at time t2 a new device D2 is introduced and an ad hoc key management process (block 101) is performed to provide one or more keys (a symmetric key, an asymmetric key, or both) to device D2 in a common key management context structure. This ad hoc key establishment may occur via a Diffie-Hellman key exchange, and the like.

At time t3 a new device D3 is introduced to D1 and an ad hoc key management process (block 102) is performed to provide one or more keys (a symmetric key, an asymmetric key, or both) to device D3 in a common key management context structure. At time t3, device D3 is also introduced (as a zone controller) to device D2 (block 103). For example, an embodiment is based on the Fluffy key management system. For example, D3 may be introduced to the first domain, to which D1 is the domain controller, by sending a request "PSK-REQ" to a key manager (e.g., device D1) for a ticket. As used herein, an example of a "request" and a "reply" include "GS K-REQ"/"PS K-REQ" and "GS K-REP"/"PS K-REP", however "GS K-FET"/"PSK-FET" may also be considered a request and "GSK-DEL"/"PSK-DEL" may also be considered a reply. Further details regarding such requests and replies are located at, for example, https://tools.ietf.org/id/draft-hardjono-ace-fluffy-00*txt (see also (see *https://datatracker.ietf.org/doc/draft-hardjono-ace-fluffy/ for version 01). The reply to such a request may use a client permissions field (cpac: the permissions and access control (PAC) structure containing permissions granted to a client associated with a key enclosed key in receipt sent to the client). The same tools (e.g., access controls structures) may be used to designate D2 as a mere client in zone controlled by Zone Controller D3. Afterwards, D2 and D3 can communicate directly (block 104). Therefore, blocks 101, 102 include ad hoc exchanges while block 103 includes an introducer method to introduce two nodes. This intruder method will be further explained with an embodiment addressed in FIG. 2.

Then at a still later time t4, another device D4 is introduced into the IoT network (block 105). Specifically, device D3, which is a zone controller, performs an ad hoc key establishment process with this device such that thereafter devices D2 and D4 can interact directly (block 107), after device D3 introduces device D4 to D2 (block 106). D4 and D2 are introduced to each other as clients (e.g., using tickets and receipts with access control lists and "cpac" designations, if using the Fluffy protocol, designated D2 and D4 as clients).

Understand while shown with these particular examples in FIG. 1, other interactions and key management flows can occur.

As the network grows in complexity, new devices may be delegated a key management responsibility (e.g., device D3 is provisioned dynamically as a zone controller at block 103 of FIG. 1). Other devices may be introduced as peers (e.g., block 106 of FIG. 1) that may interact directly using supplied credentials.

Note that credentials may be used to assign other roles (e.g., something other than "zone controller" or "client" as shown in FIG. 1) meaningful in the context of an IoT application/function. For example, devices may cooperate in the context of a publish-subscribe interaction where some devices may be given a publisher role while other devices may be assigned a subscriber role, and still other devices provided a broker role (e.g., using the "pac" designation if the Fluffy protocol is used). All roles may be issued under a credential that specifies a topic of interaction (e.g., using "crlm" or "crealm" realm entry if the Fluffy protocol is used) such that off-topic interactions may require a different credential, allowing the devices to function in different roles for the other topic.

In embodiments, a network topology can be flexibly partitioned to allow intra-zone interactions to receive minimal intermediation to apply security, privacy and safety constraints. Stated another way, a flexible re-intermediation of key management between various domains and zones may occur. Understand that a domain is a logical collection of devices under a common administrative control. In turn, a zone is a logical construct within a given domain to enable scaling of key management within the domain to logically combine a smaller collection of devices to work within a common boundary, referred to as a zone.

Understand that in different embodiments, various security policies may be identified on a zone or domain basis. In one example case, free interaction may occur within a zone, while some type of security policy may be enforced on communications between zones. Still further, greater security policies may be enforced for communications between different domains.

In any case, embodiments provide flexible and dynamic scaling of security in IoT networks, while enabling peer-to-peer communication between devices within one or more zones within a domain, as well as between devices present in one or more different zones of different domains.

Figure 2:
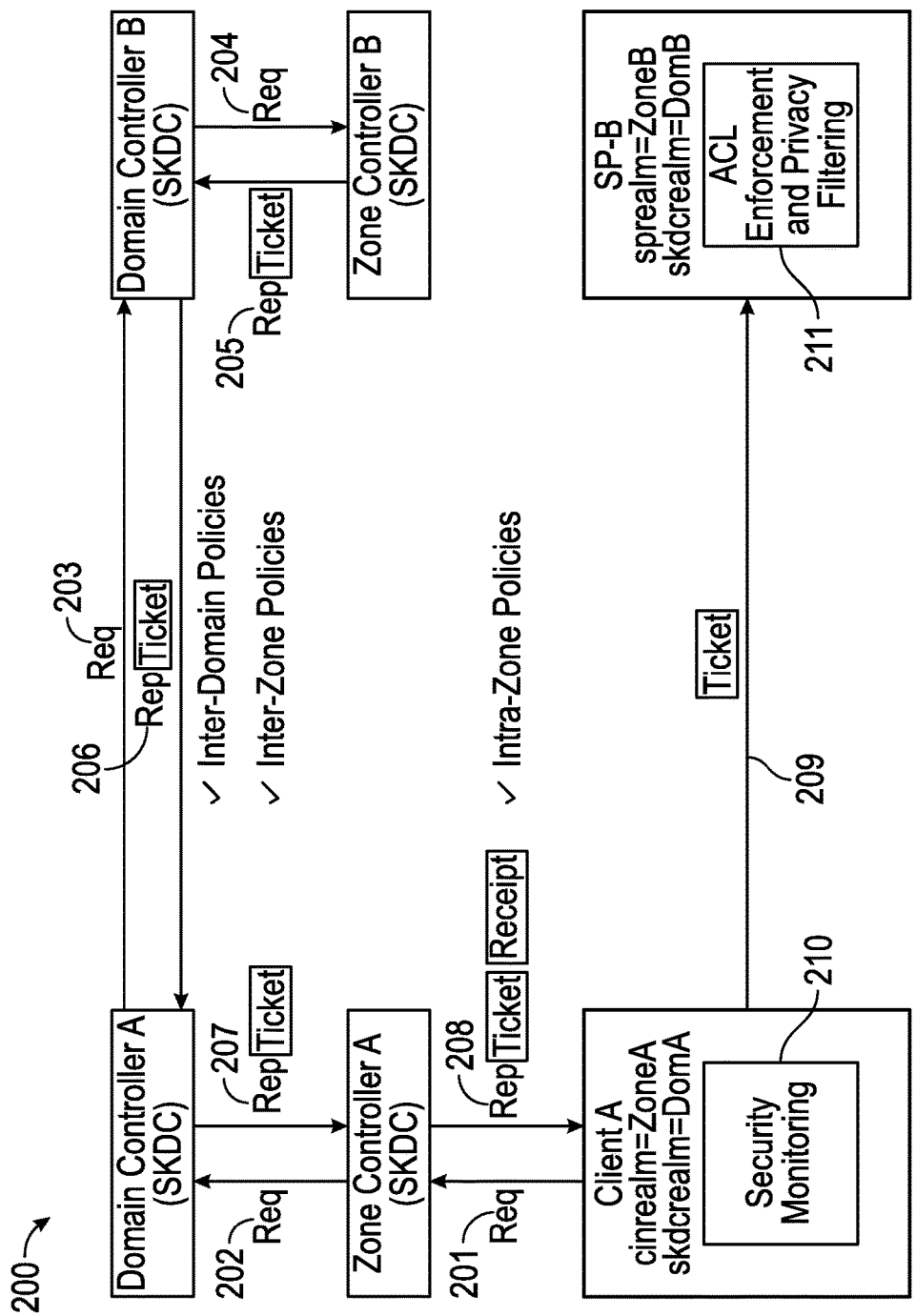
FIG. 2 is a block diagram of a portion of an IoT network in accordance with an embodiment.

Referring now to FIG. 2, shown is a block diagram of a portion of an IoT network in accordance with an embodiment. As shown, multiple devices are present in 2 different domains, namely domain A that includes a domain controller A, which may be a simple key distribution center (SKDC), underneath which a zone controller A is provided (which also may be a SKDC), which in turn interacts with a client IoT device of the same domain and zone. Similar devices are present in a second domain B. For example, with the Fluffy protocol the SKDC) is the entity which mediates the establishment of the pair-wise shared key between the client and service principal. Specifically, domain B includes a domain controller B, which may be a SKDC, underneath which a zone controller B is provided (which also may be a SKDC), which in turn interacts with a client IoT device of the same domain and zone.

As seen in FIG. 2, various interactions can occur in process 200 within and between zones and domains. For example, to enable direct peer-to-peer communication between client device A of the first zone and first domain and a client device B (SP B) of the second domain and the second zone, a request (block 201) can be initiated from client A to its zone controller and domain controller (blocks 202, 203) to in turn receive a ticket and a receipt (blocks 205, 206, 207, 208) that includes security credentials to control the interaction between these devices. More specifically, client A understands it is to communicate outside its domain via its known hierarchy, the Zone Controller A and the Domain Controller A. This may be enforced via client permissions (cpac in the Fluffy protocol) applied to Client A when Client A was on-boarded to domain A by Zone Controller A (which may be a SKDC). Thus, Client A may form a request, such as "PSK-REQ" in the Fluffy protocol, (block 201). The request may include fields such as, for example, Key Type (kty) (this denotes the type of key being requested by the sender (client or SP) of the request), Desired algorithm (etype) (this is the algorithm that is desired (or supported) by the sender of the request (client or SP); SKDC options (these are flags that are intended for the SKDC only); SKDCs realm (skdcrealm) (this the name of the realm, domain or zone of the SKDC); SKDC's identity (skdcname) (this is the identity of the SKDC); Service principal's realm (sprealm) (this the name of the realm, domain or zone of the service principal in a PSK-REQ message. In a GSK-REQ message it is the realm of the multicast group); Service principal's identity (spname) (in a PSK-REQ message this is the identity of the service principal. In a GSK-REQ message it is the identity or name of the multicast group); Client permissions (cpac) (in a PSK-REQ message this is the permissions desired by the client for itself. In a GSK-REQ message this is the permissions desired by the client for the multicast group). Analogous fields in non-Fluffy protocols may serve the same purpose. The request may be forwarded along to Domain Controller B and Zone Controller B (blocks 202, 203, 204) based on the "sprealm" field indicating SP B is the desired party.

A reply may be formed, such as "PSK-REP" including a miniticket contains the following (see FIG. 3): Issuing SKDC's realm (skdcrealm) (this the name of the realm, domain or zone of the SKDC that issued this miniticket) (304); Issuing SKDC's identity (skdcname) (this is the identity of the SKDC that issued this miniticket); Service principal's realm (sprealm) (this the name of the realm, domain or zone of the service principal for whom this miniticket is destined) (306); Service Principal's identity (spname) (this is the identity of the service principal for whom this miniticket is destined) (305); Encrypted miniticket part (enc-part) (this is the encrypted part of the miniticket intended for the service principal. It is encrypted using the secret key shared pair-wise between the SKDC and the service principal) (307). The encrypted part contains the following (see Fluffy protocol for more details): Client's realm (crealm) (this the name of the realm, domain or zone of the client with whom the receiver of this miniticket shares the enclosed key) (308); Client's identity (cname) (this is the identity of the client with whom the receiver of this miniticket shares the enclosed key) (309); Client permissions (cpac) (this is the permissions and access control (PAC) structure containing permissions granted to the client associated with the enclosed key, and through which inter-domain security policies may be enforced) (310); Time of authentication (authtime) (this is the time at the SKDC when it created this miniticket in response to a request); Expiration time of key (endtime) (this is the expiration time of the key in this miniticket) (311); Service principal permissions (sppac): (this is the permissions and access control (PAC) structure granted to the service principal associated with the enclosed key, through which inter-domain security policies may be enforced) (312); Transited realms (transited) (this is the set of SKDCs and realms that was involved in the issuance of the miniticket for the service principal. This field is used for cross-realm ticket issuance and may include, for example, Zone Controller B and Domain Controller B) (313); Key data (keydata) (this fields contains the key-data structure that carries the cryptographic key and other parameters necessary for operating the key) (314). This area may include a symmetric key, a public and private key pair, a public key, and/or combinations thereof.

Receipt 303 may also be returned at blocks 205, 206, 207, 208, 209. Receipt fields 304', 305', 306', 314', 311', 310' are analogous to fields 304, 305, 306, 314, 311, 310 of ticket 302. As provided in the Fluffy protocol, the miniticket is created by the SKDC (e.g., Zone Controller B) and is intended for the service principal (SP B) (although it is delivered via Client A, which initiates the process with the PSK-REQ message). The SKDC responds to the client by sending a PSK-Response (PSK-REP) message containing the miniticket and a receipt. The miniticket contains a copy of the encryption key to be delivered to the service principal by the client in a PSK-Establish (PSK-ESTB) message. As such, the sensitive parts (enc-part) of the miniticket are encrypted using the service principal's secret key (which it shares pair-wise with the SKDC). The receipt is created by the SKDC (e.g., Zone Controller B) and is used for the SKDC to deliver a key to a requesting party (be it client, service principal or multicast group members).

Figure 4:
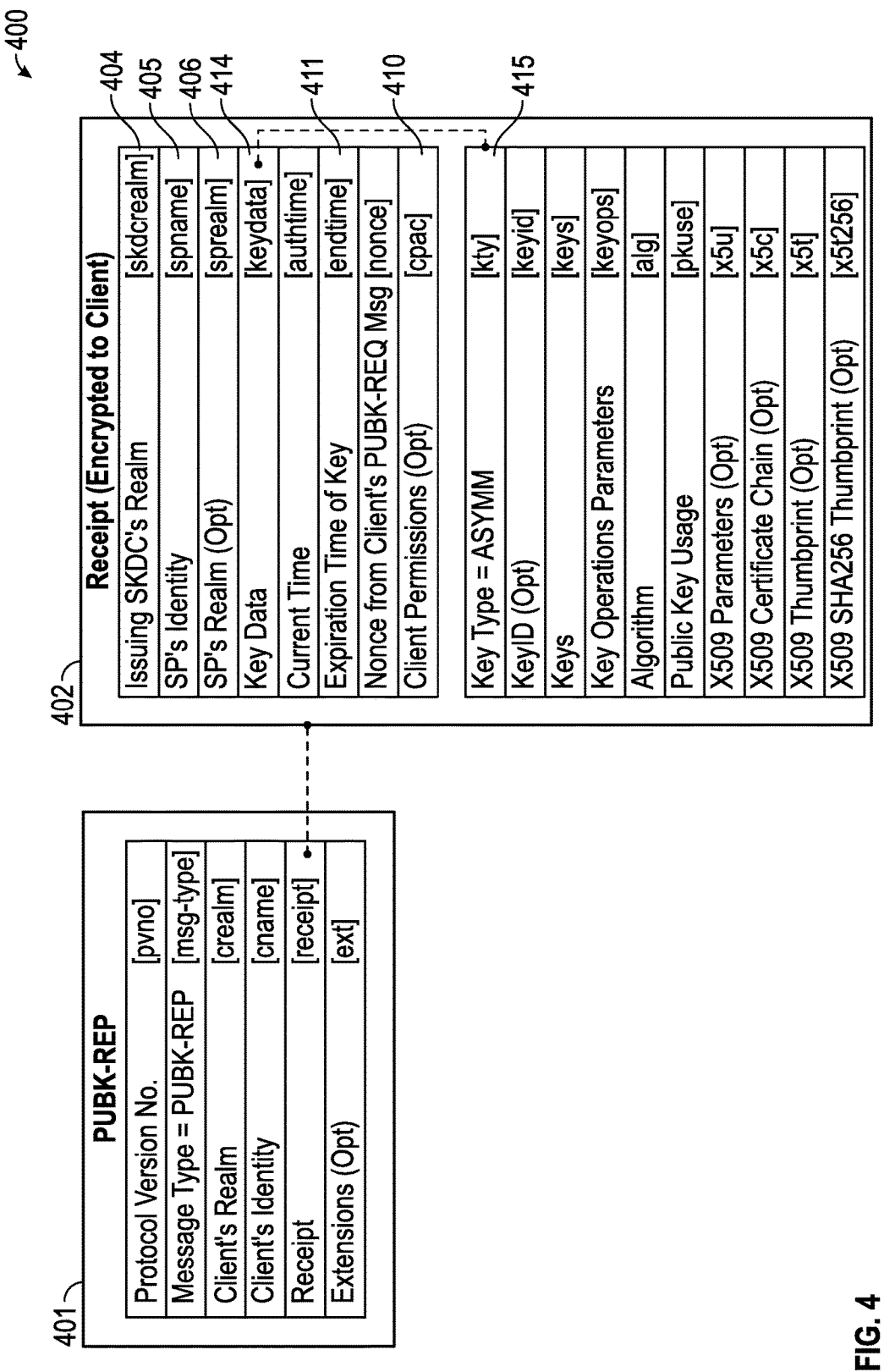
FIG. 4 is an example key management context structure that may be used in connection with an asymmetric key.

FIG. 4 includes an analogous container but provides an asymmetric pair to Client A. Specifically, reply 401 is analogous to reply 301. Reply 401 includes fields 404, 405, 406, 414, 411, 410, 415 that are analogous to fields 304', 305', 306', 314', 311', 310', 315' (which field 415 including a key pair instead of a symmetric key). In such a case, SP B may inquire with Zone Controller B for a public key corresponding to the asymmetric pair (or a miniticket may be used as described in the Fluffy protocol).

Note that both client devices may include logic to enforce policy associated with the given devices as identified in the common key management structure that provides appropriate keys for controlling the communications. As such, the enforcement point for applying security policy is in the endpoint devices themselves, reducing complexity and network interaction. In some embodiments, a key provided in such structure can be used to bind a security policy and to create a secure channel between the devices which may be used for further communications. For example, security monitoring 210 and ACL enforcement and privacy filtering 211 may be tied to keys (see ticket of block 209) via cpac 310', 310 and sppac 312.

Note that in some embodiments, the common key management structure can be used as a generic ticket format that can be used for data exchanges. In this way, the complexity of setting up an independent TLS session between devices to send the data can be avoided. As an example, data can be securely containerized within this common key management structure (see FIGS. 3 and 4) and header information within the key management structure can be used to appropriately route packets of a given data communication. Note that a secure data channel can be established between devices responsive to the request for inter-domain (and inter-zone) interaction between the two IoT devices. Inter-zone and inter-domain interactions may require additional vetting when IoT devices cross zonal and domain boundaries. As such, inter-zonal and/or inter-domain interactions may receive added scrutiny as part of key issuance (see, e.g., elements 210, 211).

Embodiments may include a scenario where a Client B initiates a connection to Client A where a session is established without first obtaining a domain (zone) ticket and receipt. Security enforcement logic may require dynamically obtaining said ticket and receipt but may omit issuance of a session key by a SKDC, instead allowing use of the ephemeral session key as the ticket prescribes. A security benefit of this approach is the SKDC need not be hardened for key storage as a trusted third party. A second benefit is that the session key may be managed more precisely having a ticket context and validity that supersedes a caching policy of an ephemeral session key. The ticket may further prescribe a method for transforming the ephemeral session key into a long-term key using a key derivation function that accepts as input the ephemeral key and attributes of the ticket.

For example, a first domain may need to establish a secure channel with a second domain with who it does not share a pre-existing trust relationship (e.g., there is no presumption of a common PKI or common Kerberos server). Hence, the domains will need to perform an ad-hoc key agreement using Diffie-Hellman or PAKE (password authenticated key exchange). In either case, there is a presumption of shared context in which to base trust. It is either context for pre-shared passwords or a context for ensuring there is no man-in-the-middle attacker (e.g., both endpoints have implemented a TEE that can attest its environment to the other).

Embodiments may include receiving a receipt or ticket containing a public asymmetric key (e.g., FIG. 4) identifying a Client B that may be used to validate a signature created by Client B in connection with a session establishment to Client A. The receipt or ticket may contain similar attributes as described in other embodiments of a ticket or receipt so that a security processor may consistently apply a security policy according to a well-defined domain or zone context.

If the request for a credential is approved, any zonal and domain considerations can be captured as policies that are applied at the point of interaction between endpoints. For example, Client-A device and SP-B device may engage in inter-domain interactions, while applying appropriate policies. Such policies may include, as representative examples, applying data filtering, device monitoring, bandwidth reservations, and the like to ensure privacy, security and safety objectives for the respective organizations and context are appropriately applied.

Figure 3:
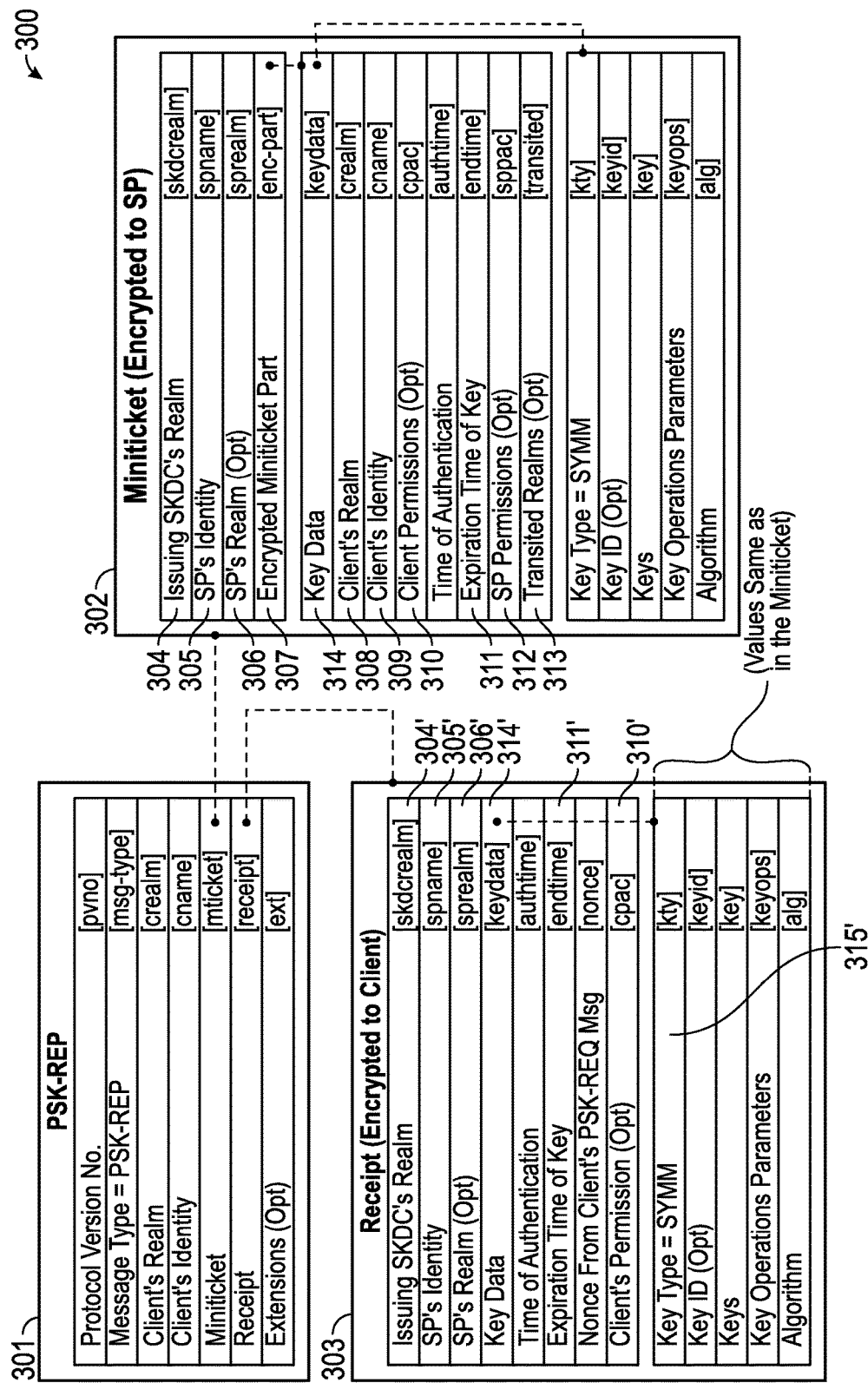
FIG. 3 is a common key management context structure in accordance with an embodiment.

Embodiments may use a common key management context structure that accommodates both symmetric and asymmetric key types. Referring now to FIG. 3, shown is a common key management context structure 300 in accordance with an embodiment. As shown in FIG. 3, a request message captures the network topology context including the zone or domain authority, specific devices having domain/zone authority and constraints of key usage based on the role, topic or informational context.

Also, as noted above regarding FIG. 3, the structure (which may be provided by a given key management entity to a client device responsive to a request (e.g., for interaction with another device in an IoT network)) may be for a symmetric key. However, other embodiments provide for issuance of both symmetric and asymmetric keys under the common context. This allows the same credential to be flexibly applied when application, network and transport circumstances call for one or the other cryptographic method.

Also, as noted above regarding FIG. 4, key management context structure 400 may be used in connection with an asymmetric key. Note that the structure further facilitates provisioning of credentials that may be used to authenticate, encrypt and integrity protect the device or data as appropriate for the intended use, whether symmetric or asymmetric cryptography is supported natively.

Thus, as described above, embodiments provide many advantages described non-exhaustively as follows. In embodiments, a key management system is self-configuring as the IoT network increases in numbers of devices. For example, an initial key management device may dynamically assign key management roles to other devices (e.g., D1 assigning Zone Controller role to D3 at t3). This may occur as a first device, such as D1, becomes overwhelmed and needs to shed some management responsibilities. And this initial device (e.g., D1) or another device (e.g., D3) can dynamically assign key management roles for delegating key management tasks (e.g., to one or more additional domain and/or zone controllers such that, for example, D3 could have determined D4 was a zone controller for a topic instead of a mere client). In this way, the key management system may further dynamically assign publish-subscribe, group formation, and other interaction patters of IoT networks.

In addition, using a common key management context structure as described herein, both symmetric and asymmetric keys can be used in equivalent circumstances for authentication and protection of devices and/or data.

Embodiments may further use a key management system to define a network topology of inter-zonal and inter-domain interaction points where security, safety and privacy considerations may be controlled at the request to cross such boundaries (but before the connection that enables such boundary crossings is established). Thus, a request by Client A to communicate with SP B indicates (based on headers such as "sprealm") that a cross-domain communication is desired so any key to facilitate such communication may be based (e.g., sppac and cpac) on the need for policies to be complied with before other communications occur.

In addition, the key management system may be configured to automatically revoke or rescind roles, privileges and access based on an expiration value (e.g., element 311) and contextual change (e.g., change to crealm 308 or sprealm 306).

In some embodiments the techniques described herein may be implemented within a trusted execution environment (TEE) such as Intel® SGX, Intel® MemCore, Intel® CSE, Intel® VT-X, Intel® IOT-OS with Smack, or ARM TrustZone, etc. to perform security operations as described herein.

Figure 5:
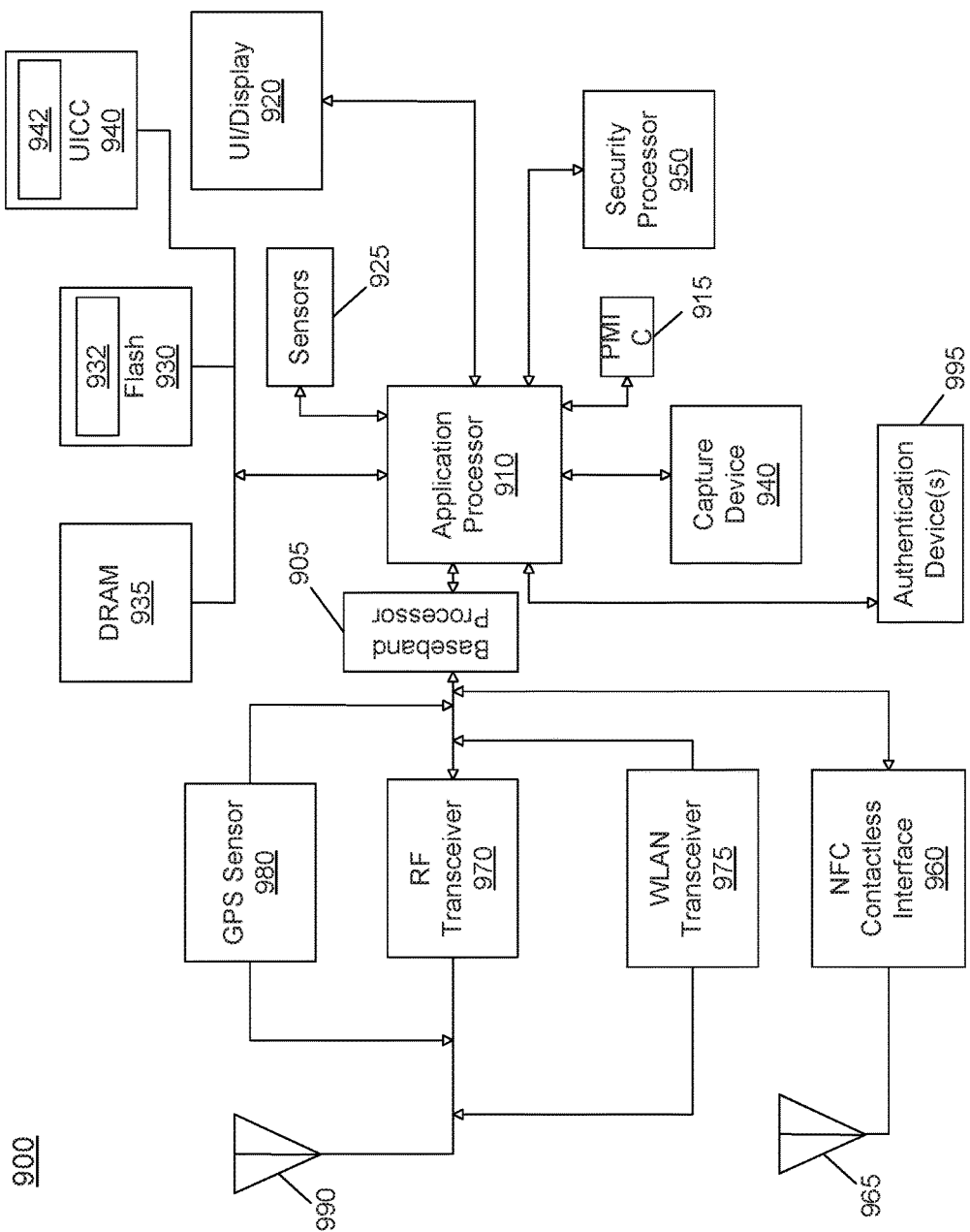
FIG. 5 is a block diagram of an example system with which embodiments can be used.

Referring now to FIG. 5, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 5, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 5, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitries may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 6:
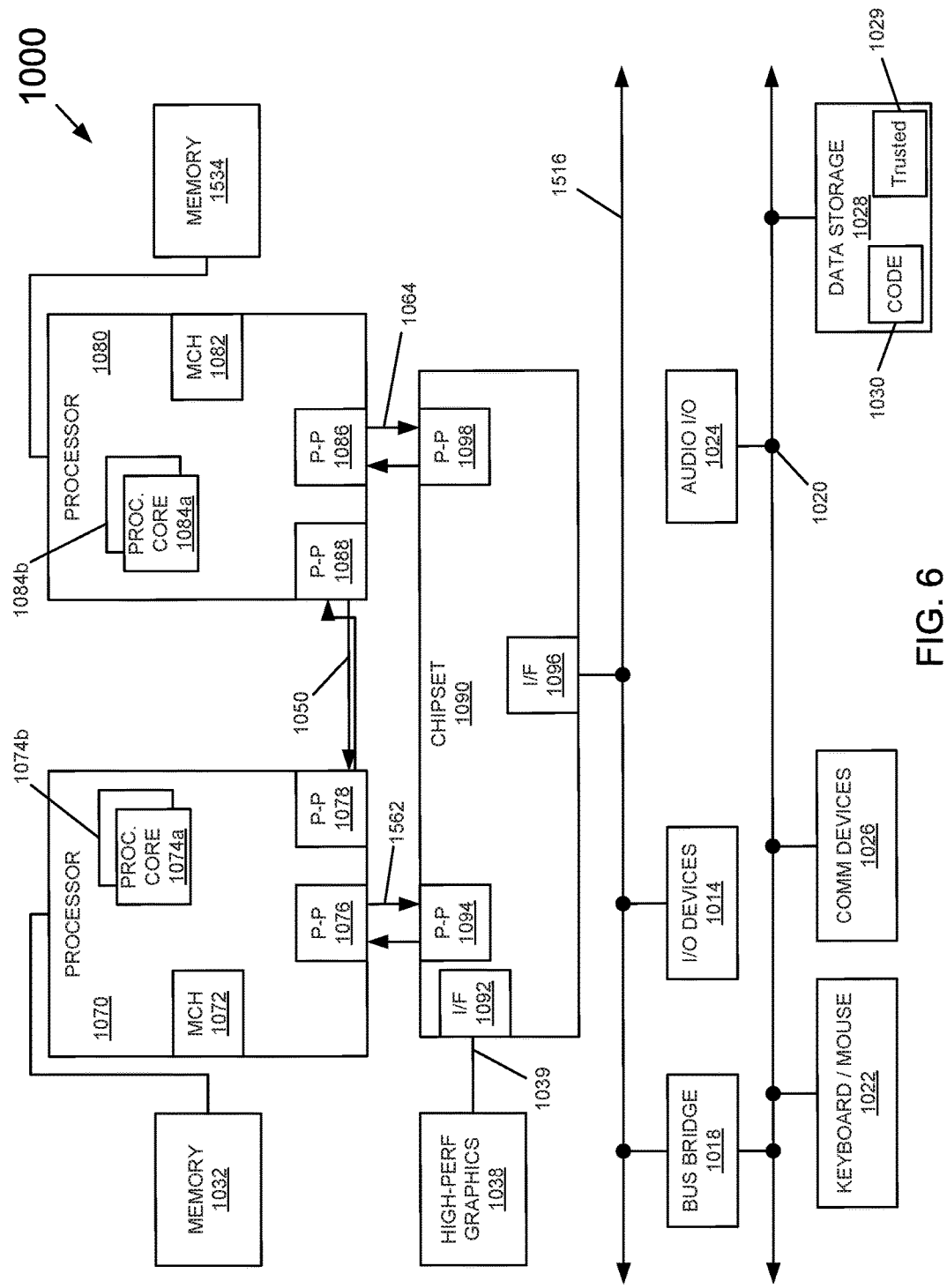
FIG. 6 is a block diagram of a system in accordance with another embodiment of the present invention.

Referring now to FIG. 6, shown is a block diagram of a system in accordance with another embodiment of the present invention. As shown in FIG. 6, multiprocessor system 1000 is a point-to-point interconnect system such as a server system, and includes a first processor 1070 and a second processor 1080 coupled via a point-to-point interconnect 1050. As shown in FIG. 6, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as key management, attestations, IoT network onboarding or so forth.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
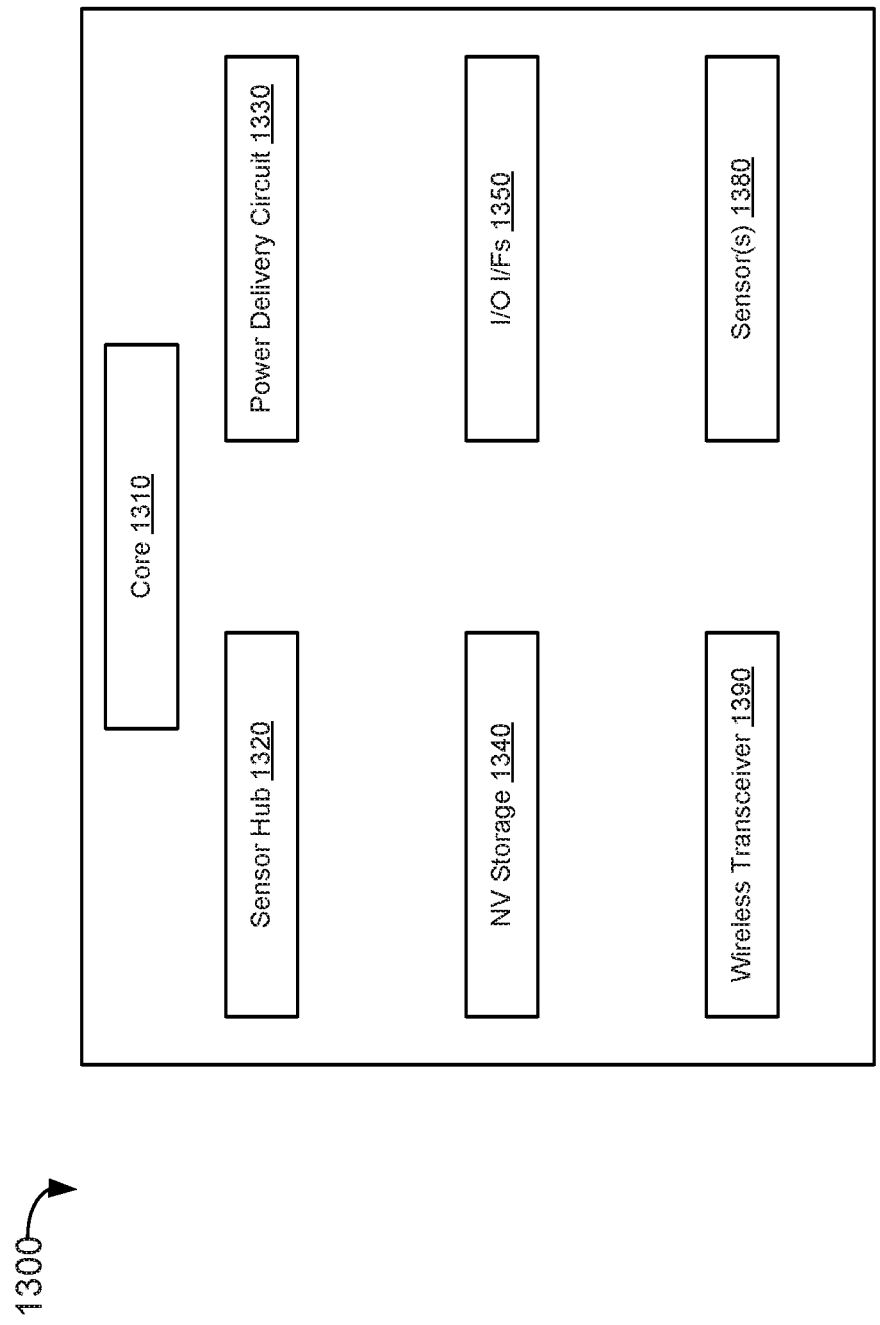
FIG. 7 is a block diagram of a system in accordance with another embodiment of the present invention.

Embodiments may be used in environments where IoT devices may include wearable devices or other small form factor IoT devices. Referring now to FIG. 7, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 includes at least one computer readable storage medium comprising instructions that when executed enable a system to: receive, in a first device, at least one of a first symmetric key and a first asymmetric key in a common key management structure, the common key management structure to accommodate asymmetric keys and symmetric keys, and further including security policy information to enable communication between the first device of a first domain of an Internet of Things (IoT) network and a second device of a second domain of the IoT network according to an inter-domain security policy; and send a first message directly from the first device to the second device according to the security policy information of the common key management structure.

In example 2 the subject matter of the Example 1 can optionally include instructions that when executed enable the system to dynamically scale the IoT network by dynamically instantiating at least one zone controller for a first zone of the IoT network, the first zone including the first device.

In example 3 the subject matter of the Examples 1-2 can optionally include instructions that when executed enable the system to dynamically scale the IoT network by dynamically instantiating at least one domain controller for the first domain, which includes the first device.

In example 4 the subject matter of the Examples 1-3 can optionally include wherein the at least one domain controller comprises a key management system.

In example 5 the subject matter of the Examples 1-4 can optionally include further comprising instructions that when executed enable the system to dynamically instantiate the first device as at least one of a domain controller for the first domain, a zone controller for a first zone of the first domain, and a client of the first domain.

In example 6 the subject matter of the Examples 1-5 can optionally include further comprising instructions that when executed enable the first device to dynamically instantiate a third device as at least one of a zone controller of the first domain and a client of the first domain.

In example 7 the subject matter of the Examples 1-6 can optionally include further comprising instructions that when executed enable the system to, in response to the first device receiving at an additional instance of the common key management structure, dynamically instantiate the first device as at least one of a domain controller for the first domain, a zone controller for a first zone of the first domain, and a client of the first domain.

In example 8 the subject matter of the Examples 1-7 can optionally include instructions that when executed enable the system to: for a first publication-subscription topic, dynamically instantiate the first device as at least one of a domain controller for the first domain, a zone controller for a first zone of the first domain, and a client of the first domain; and for a second publication-subscription topic, dynamically instantiate the first device as at least one of a domain controller for at least one of the first domain and an additional domain, a zone controller for at least one of the first zone and an additional zone of the additional domain, and a client for at least one of the first domain and the additional domain.

In example 9 the subject matter of the Examples 1-8 can optionally include instructions that when executed enable the system to: receive a second message in the first device directly from the second device; and enforce, in the first device, the inter-domain security policy with regard to the second message.

In example 10 the subject matter of the Examples 1-9 can optionally include instructions that when executed enable the system to: receive a third message in the first device directly from a third device; and enforce, in the first device, an intra-domain security policy with regard to the third message; wherein (a) the intra-domain and inter-domain policies are not equal to each other; and (b) the first and third devices, but not the second device, are included in a first domain.

In example 11 the subject matter of the Examples 1-10 can optionally include wherein the inter-domain policy corresponds to at least one of data filtering, malware screening, and bandwidth reservations.

In example 12 the subject matter of the Examples 1-11 can optionally include instructions that when executed enable the system to receive the common key management structure from a first zone controller, the first zone controller dynamically assigned a key management role from an initial key management system of the IoT network.

In example 13 the subject matter of the Examples 1-12 can optionally include wherein the first zone controller and the first device are both included in the first domain, which does not include the second device.

In example 14 the subject matter of the Examples 1-13 can optionally include instructions that when executed enable the system to: encrypt, in the first device, the first message using the first symmetric key; and send, directly from the first device to the second device, an additional instance of the first symmetric key; wherein (a) the additional instance of the first symmetric key is encrypted based on keys shared between the second device and a third device but not the first device; and (b) the second and third devices are each included in the second domain, which does not include the first device.

In example 15 the subject matter of the Examples 1-14 can optionally include wherein (a) the first domain is a logical collection of devices, including the first device, under a common administrative control administered by at least one of the collection of devices, and (b) a zone is a logical subset of the devices under a common administrative control administered by at least one of the subset of the devices.

In example 16 the subject matter of the Examples 1-15 can optionally include instructions that when executed enable the system to receive the common key management structure from a key management system responsive to a request from the first device to interact with the second device.

In example 17 the subject matter of the Example 1-16 can optionally include instructions that when executed enable the system to cause the common key management structure to expire according to expiration information of the common key management structure, and thereafter prevent interaction between the first device and the second device.

In example 18 the subject matter of the Examples 1-17 can optionally include instructions that when executed enable the system to: receive, in the first device, the first symmetric key in the common key management structure included in a first communication; and receive, in the first device, the first asymmetric key in the common key management structure included in a second communication.

In example 19 the subject matter of the Examples 1-18 can optionally include wherein the first symmetric key corresponds to a first encryption protocol and the first asymmetric key corresponds to a second encryption protocol unequal to the first encryption protocol.

In example 20 the subject matter of the Examples 1-19 can optionally include instructions that when executed enable the system to receive, in the first device, the first symmetric key and the first asymmetric key in the common key management structure.

In example 21 the subject matter of the Examples 1-20 can optionally include instructions that when executed enable the system to: receive, in the first device, the first asymmetric key in the common key management structure; and encrypt, in the first device, the first message using the first asymmetric key.

In example 22 the subject matter of the Examples 1-21 can optionally include instructions that when executed enable the system to send the first message in a data portion of a second common key management structure.

Example 23 includes a first device comprising: at least one hardware processor to execute instructions; at least one network interface to enable the at least one hardware processor to communicate with second and third computing nodes coupled in an Internet of Things (IoT); at least one non-transitory storage medium having instructions stored thereon for causing the at least one hardware processor of the first device to: receive at least one of a first symmetric key and a first asymmetric key in a common key management structure, the common key management structure to accommodate asymmetric keys and symmetric keys, wherein the common key management structure includes security policy information to enable communication between the first device of a first domain of an Internet of Things (IoT) network and a second device of a second domain of the IoT network according to an inter-domain security policy; and send a first message directly to the second device according to the security policy information of the common key management structure.

In example 24 the subject matter of the Example 23 can optionally include The first device of claim 23, the at least one medium further comprising instructions that when executed enable the first device to dynamically instantiate at least one zone controller for a first zone of the IoT network, the first zone including the first device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   receive, in a first device, a first symmetric key in a common key management structure in a first communication, the common key management structure further including security policy information to enable communication between the first device of a first domain of an Internet of Things (IoT) network and a second device of a second domain of the IoT network according to an inter-domain security policy;
   receive, in the first device, a first asymmetric key in another instance of the common key management structure included in a second communication; and
   send a first message directly from the first device to the second device according to the security policy information of the common key management structure.

2. The at least one computer readable storage medium of claim 1, further comprising instructions that when executed enable the system to dynamically scale the IoT network by dynamically instantiating at least one zone controller for a first zone of the IoT network, the first zone including the first device.

3. The at least one computer readable storage medium of claim 1, further comprising instructions that when executed enable the system to dynamically scale the IoT network by dynamically instantiating at least one domain controller for the first domain, which includes the first device.

4. The at least one computer readable storage medium of claim 3, wherein the at least one domain controller comprises a key management system.

5. The at least one computer readable storage medium of claim 1, further comprising instructions that when executed enable the system to dynamically instantiate the first device as at least one of a domain controller for the first domain, a zone controller for a first zone of the first domain, or a client of the first domain.

6. The at least one computer readable storage medium of claim 1, further comprising instructions that when executed enable the first device to dynamically instantiate a third device as at least one of a zone controller of the first domain or a client of the first domain.

7. The at least one computer readable storage medium of claim 1, further comprising instructions that when executed enable the system to, in response to the first device receiving an additional instance of the common key management structure, dynamically instantiate the first device as at least one of a domain controller for the first domain, a zone controller for a first zone of the first domain, or a client of the first domain.

8. The at least one computer readable storage medium of claim 1, further comprising instructions that when executed enable the system to:
for a first publication-subscription topic, dynamically instantiate the first device as at least one of a domain controller for the first domain, a zone controller for a first zone of the first domain, or a client of the first domain; and
for a second publication-subscription topic, dynamically instantiate the first device as at least one of a domain controller for at least one of the first domain or an additional domain, a zone controller for at least one of the first zone or an additional zone of the additional domain, or a client for at least one of the first domain or the additional domain.

9. The at least one computer readable storage medium of claim 1, further comprising instructions that when executed enable the system to:
receive a second message in the first device directly from the second device; and
enforce, in the first device, the inter-domain security policy with regard to the second message.

10. The at least one computer readable storage medium of claim 9, further comprising instructions that when executed enable the system to:
receive a third message in the first device directly from a third device; and
enforce, in the first device, an intra-domain security policy with regard to the third message;
wherein (a) the intra-domain and inter-domain policies are not equal to each other; and (b) the first and third devices, but not the second device, are included in the first domain.

11. The at least one computer readable storage medium of claim 10, wherein the inter-domain policy corresponds to at least one of data filtering, malware screening, or bandwidth reservations.

12. The at least one computer readable storage medium of claim 1, further comprising instructions that when executed enable the system to receive the common key management structure from a first zone controller, the first zone controller dynamically assigned a key management role from an initial key management system of the IoT network.

13. The at least one computer readable storage medium of claim 12, wherein the first zone controller and the first device are both included in the first domain, which does not include the second device.

14. The at least one computer readable storage medium of claim 1, further comprising instructions that when executed enable the system to:
encrypt, in the first device, the first message using the first symmetric key; and
send, directly from the first device to the second device, an additional instance of the first symmetric key;
wherein (a) the additional instance of the first symmetric key is encrypted based on keys shared between the second device and a third device but not the first device; and (b) the second and third devices are each included in the second domain, which does not include the first device.

15. The at least one computer readable storage medium of claim 14, wherein (a) the first domain is a logical collection of devices, including the first device, under a common administrative control administered by at least one of the collection of devices, and (b) a zone is a logical subset of the devices under a common administrative control administered by at least one of the subset of the devices.

16. The at least one computer readable storage medium of claim 1, further comprising instructions that when executed enable the system to receive the common key management structure from a key management system responsive to a request from the first device to interact with the second device.

17. The at least one computer readable storage medium of claim 1, further comprising instructions that when executed enable the system to cause the common key management structure to expire according to expiration information of the common key management structure, and thereafter prevent interaction between the first device and the second device.

18. The at least one computer readable storage medium of claim 1, wherein the first symmetric key corresponds to a first encryption protocol and the first asymmetric key corresponds to a second encryption protocol unequal to the first encryption protocol.

19. The at least one computer readable storage medium of claim 1, further comprising instructions that when executed enable the system to:
encrypt, in the first device, the first message using the first asymmetric key.

20. The at least one computer readable storage medium of claim 1, further comprising instructions that when executed enable the system to send the first message in a data portion of a second common key management structure.

21. A first computing node comprising:
at least one hardware processor to execute instructions;
at least one network interface to enable the at least one hardware processor to communicate with second and third computing nodes coupled in an Internet of Things (IoT) network;
at least one non-transitory storage medium having instructions stored thereon for causing the at least one hardware processor of the first computing node to:
receive at least one of a first symmetric key or a first asymmetric key in a common key management structure, wherein the common key management structure includes security policy information to enable communication between the first computing node of a first domain of the IOT network and the second computing node of a second domain of the IoT network according to an inter-domain security policy;
send a first message directly to the second computing node according to the security policy information of the common key management structure;
encrypt the first message using the first symmetric key; and
send, directly to the second computing node, an additional instance of the first symmetric key;
wherein (a) the additional instance of the first symmetric key is encrypted based on keys shared between the second computing node and a third computing node but not the first computing node; and (b) the second and third computing nodes are each included in the second domain, which does not include the first computing node.

22. The first device of claim 21, the at least one medium further comprising instructions that when executed enable the first computing node to dynamically instantiate at least one zone controller for a first zone of the IoT network, the first zone including the first device.

23. At least one non-transitory computer readable storage medium comprising instructions that when executed enable a system to:

receive, in a first device, a first symmetric key and a first asymmetric key in a common key management structure, the common key management structure further including security policy information to enable communication between the first device of a first domain of an Internet of Things (IoT) network and a second device of a second domain of the IoT network according to an inter-domain security policy; and send a first message directly from the first device to the second device according to the security policy information of the common key management structure.

24. The at least one computer readable storage medium of claim 23, further comprising instructions that when executed enable the system to:

receive a second message in the first device directly from the second device;

enforce, in the first device, the inter-domain security policy with regard to the second message;

receive a third message in the first device directly from a third device; and enforce, in the first device, an intra-domain security policy with regard to the third message;

wherein (a) the intra-domain and inter-domain policies are not equal to each other; and (b) the first and third devices, but not the second device, are included in the first domain.

* * * * *